(12) United States Patent
Gilchrist, Jr.

(10) Patent No.: US 10,050,555 B2
(45) Date of Patent: Aug. 14, 2018

(54) POWER SUPPLIES HAVING SYNCHRONOUS AND ASYNCHRONOUS MODES OF OPERATION

(71) Applicant: Emerson Network Power, Energy Systems, North America, Inc., Lombard, IL (US)

(72) Inventor: Franklin Gilchrist, Jr., Warrenville, IL (US)

(73) Assignee: VERTIV ENERGY SYSTEMS, INC., Lombard, IL (US)

( * ) Notice: Subject to any disclaimer, the term of this patent is extended or adjusted under 35 U.S.C. 154(b) by 6 days.

(21) Appl. No.: 15/462,032

(22) Filed: Mar. 17, 2017

(65) Prior Publication Data

US 2017/0272003 A1    Sep. 21, 2017

Related U.S. Application Data

(60) Provisional application No. 62/310,399, filed on Mar. 18, 2016.

(51) Int. Cl.
| | | |
|---|---|---|
| *H02M 7/217* | (2006.01) | |
| *H02M 1/08* | (2006.01) | |
| *H02M 1/00* | (2006.01) | |

(52) U.S. Cl.
CPC ............. *H02M 7/217* (2013.01); *H02M 1/08* (2013.01); *H02M 2001/0009* (2013.01)

(58) Field of Classification Search
CPC . H02M 7/217; H02M 1/08; H02M 2001/0009
See application file for complete search history.

(56) References Cited

U.S. PATENT DOCUMENTS 5,414,341 A    5/1995    Brown
5,956,245 A *  9/1999    Rozman ................. H02J 1/102
                                                          363/127

(Continued)

OTHER PUBLICATIONS

Zhou, et al., A High Efficiency, Soft Switching DC-DC Converter with Adaptive Current-Ripple Control for Portable Applications (5 pages).

(Continued)

*Primary Examiner* — Adolf Berhane
*Assistant Examiner* — Bart Iliya
(74) *Attorney, Agent, or Firm* — Harness, Dickey & Pierce, P.L.C.

(57) ABSTRACT

The present disclosure relates to power supplies and control methods for power supplies. Example power supplies include an output terminal, a transformer having a secondary winding including a first terminal and a second terminal, first and second diodes coupled between the output terminal and the first and second terminals, respectively, first and second switches coupled between the output terminal and the first and second terminals, respectively, and a controller coupled to the first switch and the second switch. The controller is configured to control the power supply in an asynchronous mode when output current is below a defined threshold so current flows to the output terminal through the first diode and the second diode, and to control the power supply in a synchronous mode when output current is above the defined threshold so current flows to the output terminal through the first switch and the second switch.

20 Claims, 3 Drawing Sheets

(56) References Cited

U.S. PATENT DOCUMENTS

| | | | |
|---|---|---|---|
| 6,185,111 B1* | 2/2001 | Yoshida | H02M 3/33592 363/17 |
| 7,092,265 B2 | 8/2006 | Kernahan | |
| 7,327,127 B2 | 2/2008 | Ho | |
| 7,342,383 B1 | 3/2008 | Song et al. | |
| 7,567,444 B2 | 7/2009 | Chen et al. | |
| 7,652,459 B2 | 1/2010 | Abu Qahouq et al. | |
| 7,859,238 B1 | 12/2010 | Stratakos et al. | |
| 8,363,430 B2 | 1/2013 | Ye | |
| 8,513,933 B2 | 8/2013 | Notman et al. | |
| 8,541,993 B2 | 9/2013 | Notman et al. | |
| 8,680,834 B2 | 3/2014 | Hoogzaad | |
| 8,853,888 B2 | 10/2014 | Khaligh | |
| 9,106,201 B1 | 8/2015 | Chakraborty et al. | |
| 2005/0275290 A1* | 12/2005 | Inn | H02J 1/102 307/55 |
| 2007/0018586 A1* | 1/2007 | Yagi | B60Q 1/143 315/79 |
| 2007/0159866 A1* | 7/2007 | Siri | H02M 3/33592 363/95 |
| 2008/0055952 A1* | 3/2008 | Chisenga | H02M 3/33592 363/134 |
| 2014/0043004 A1 | 2/2014 | Abramov | |
| 2014/0226369 A1 | 8/2014 | Kimura et al. | |
| 2014/0253086 A1* | 9/2014 | Rosu-Hamzescu | H03K 17/0822 323/311 |
| 2014/0307483 A1 | 10/2014 | Sigamani et al. | |
| 2015/0084613 A1 | 3/2015 | Ho et al. | |
| 2015/0137776 A1 | 5/2015 | Thomas et al. | |
| 2015/0138844 A1 | 5/2015 | Karlsson et al. | |
| 2015/0295421 A1* | 10/2015 | Blakemore | H02J 7/007 320/129 |
| 2015/0364998 A1 | 12/2015 | North | |

OTHER PUBLICATIONS

Abdessamad, et al., Design and Modeling of DC/DC Boost Converter for Mobile Device Applications, May 2013 (8 pages).

* cited by examiner

POWER SUPPLIES HAVING SYNCHRONOUS AND ASYNCHRONOUS MODES OF OPERATION

CROSS-REFERENCE TO RELATED APPLICATION

This application claims the benefit and priority of U.S. Provisional Application No. 62/310,399 filed Mar. 18, 2016. The entire disclosure of the above application is incorporated by reference herein.

FIELD

The present disclosure relates to power supplies having synchronous and asynchronous modes of operation.

BACKGROUND

This section provides background information related to the present disclosure which is not necessarily prior art.

Some power supplies operate using an asynchronous mode of operation, while other power supplies operate using a synchronous mode of operation. Power supplies that operate in the asynchronous mode of operation may include diodes coupled to the secondary winding of a transformer. Power supplies that operation in a synchronous mode of operation may include switches coupled to a secondary winding of the transformer. Asynchronous power supplies may have greater efficiency at lower output currents. Synchronous power supplies may have greater efficiency at higher output currents.

SUMMARY

This section provides a general summary of the disclosure, and is not a comprehensive disclosure of its full scope or all of its features.

According to one aspect of the present disclosure, a power supply includes an output terminal for supplying an output current to a load and a transformer having a primary winding and a secondary winding. The secondary winding includes a first terminal at one end of the secondary winding and a second terminal at an opposite end of the secondary winding. The power supply also includes a first diode coupled between the first terminal of the secondary winding and the output terminal, and a second diode coupled between the second terminal of the secondary winding and the output terminal. A first switch is coupled between the first terminal of the secondary winding and the output terminal, and a second switch is coupled between the second terminal of the secondary winding and the output terminal. The power supply further includes a controller coupled to the first switch and the second switch. The controller is configured to control the power supply in an asynchronous mode when the output current is below a defined threshold by turning off the first switch and the second switch so current flows to the output terminal through the first diode and the second diode, and to control the power supply in a synchronous mode when the output current is above the defined threshold by alternately turning on the first switch and the second switch so current flows to the output terminal through the first switch and the second switch.

According to another aspect of the present disclosure, a method of operation a power supply is disclosed. The power supply generally includes an output terminal, a transformer having a primary winding and a secondary winding, the secondary winding having a first terminal at a first end of the secondary winding and a second terminal at an opposite end of the secondary winding, a first diode coupled between the first terminal and the output terminal, a second diode coupled between the second terminal and the output terminal, a first switch coupled between the first terminal and the output terminal, and a second switch coupled between the second terminal and the output terminal. The method generally includes sensing an output current at the output terminal of the power supply. When the sensed current is below a defined threshold, the method includes operating the power supply in an asynchronous mode by turning off the first switch and the second switch so current flows to the output terminal through the first diode and the second diode. When the sensed current is above a defined threshold, the method includes operating the power supply in a synchronous mode by alternately turning on the first switch and the second switch so current flows to the output terminal through the first switch and the second switch.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding features throughout the several views of the drawings.

DETAILED DESCRIPTION

Figure 1:
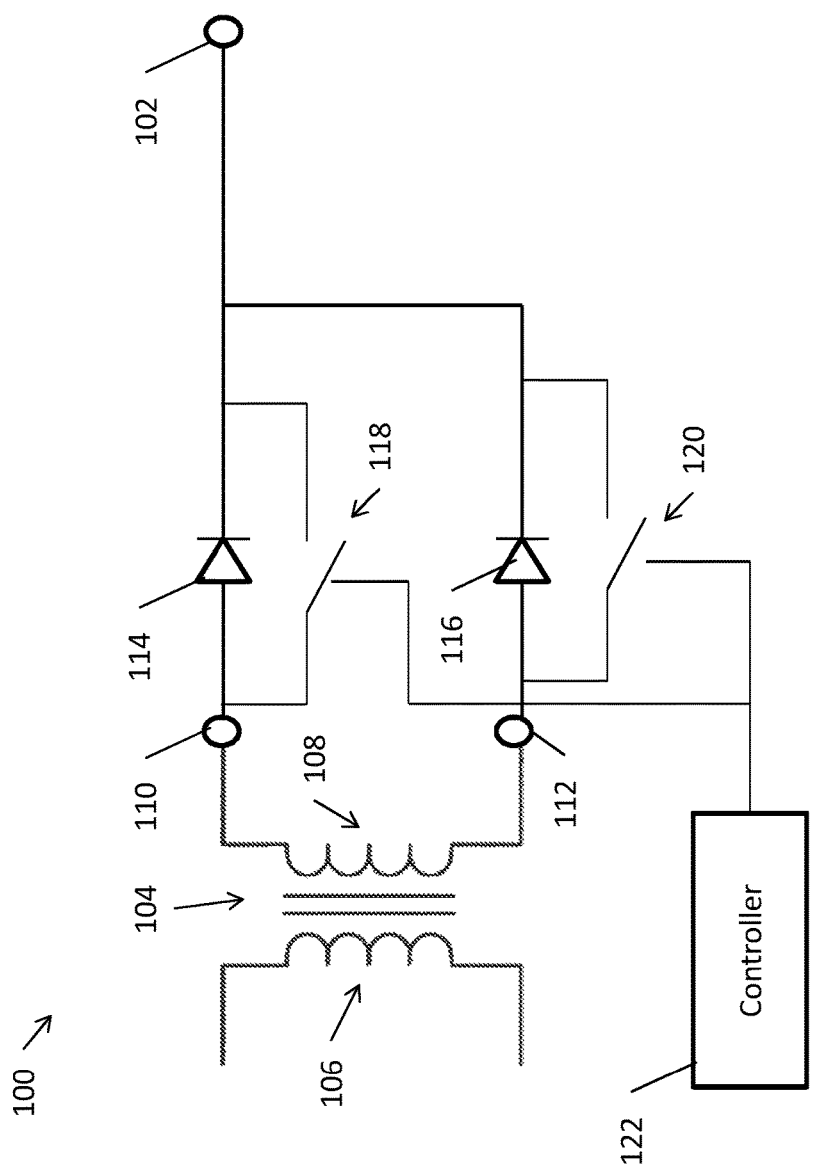
FIG. 1 is a block diagram of an example power supply according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A power supply according to one example embodiment of the present disclosure is illustrated in FIG. 1 and indicated generally by reference number 100. As shown in FIG. 1, the power supply 100 includes an output terminal 102 for supplying an output current to a load, and a transformer 104 having a primary winding 106 and a secondary winding 108. The secondary winding 108 includes a terminal 110 at one end of the secondary winding 108, and another terminal 112 at an opposite end of the secondary winding 108.

A diode 114 is coupled between the terminal 110 of the secondary winding 108 and the output terminal 102. Another diode 116 is coupled between the terminal 110 of the secondary winding 108 and the output terminal 102.

A switch 118 is coupled between the terminal 110 of the secondary winding 108 and the output terminal 102. Another switch 120 is coupled between the terminal 110 of the secondary winding 108 and the output terminal 102.

The power supply 100 includes a controller 122 coupled to the switch 118 and the switch 120. The controller 122 is configured to control the power supply 100 in an asynchronous mode of operation when the output current is below a defined threshold by turning off the switch 118 and the switch 120. This causes current to flow to the output terminal 102 through the diode 114 and the diode 116. For example, turning off the switches 118 and 120 may cause current to alternatively flow through the diodes 114 and 116 in an asynchronous mode of operation, depending on the polarity of the voltage across the secondary winding 108 of the transformer 104.

The controller 122 is configured to control the power supply 200 in a synchronous mode of operation when the output current is above the defined threshold by alternately turning on and off the switch 118 and the switch 120. This causes current to flow to the output terminal 102 through the switch 118 and the switch 120. For example, the controller 122 may alternately turn on and off the switches 118 and 120 based on the polarity of the voltage across the secondary winding 108 of transformer 104 (e.g., so the switch 118 and the switch 120 each conduct current during their respective voltage polarities of transformer current direction). In this case, the controller 122 turns on the switch 118 when a voltage across the secondary winding 108 of the transformer 104 is positive (and optionally turns off the switch 120), and the controller 122 turns on the switch 120 when the voltage across the secondary winding 108 of transformer 104 is negative (and optionally turns off the switch 118).

As described above, the controller 122 is configured to control the switches 118 and 120 to operate the power supply 100 in one of two different modes of operation, based on the output current. At lower output current levels the controller 122 operates the power supply 100 in an asynchronous mode of operation (e.g., in an asynchronous topology), which may include a discontinuous conduction mode (DCM) (e.g., the controller 122 operates an inductor of the power supply 100 in a DCM mode, etc.). At higher output current levels the controller 122 operates the power supply 100 in a synchronous mode of operation (e.g., in a synchronous topology), which may include a continuous conduction mode (CCM) (e.g., the controller 122 operates the inductor of the power supply 100 in a CCM mode, etc.). Therefore, turning on and turning off the switches 118 and 120 can adjust the topology of the power supply 100 by connecting or disconnecting components between the secondary winding 108 and the output terminal 102.

As compared to using only a synchronous mode of operation for the power supply 100, using both an asynchronous mode and a synchronous mode can increase efficiency of the power supply 100 over a larger output current range. For example, adding the asynchronous mode of operation can increase efficiency at lower output current levels (e.g., below twenty five percent of a maximum load current of the power supply, etc.). This may produce a flatter efficiency response over a range from zero output current to a high output current (e.g., 100% maximum, etc.).

As described above, the controller 122 controls the switches 118 and 120 to change between the synchronous and asynchronous modes of operation. The controller 122 activates the switches 118 and 120 to operate the power supply 100 in a synchronous topology, and deactivates the switches 118 and 120 to operate the power supply 100 in a synchronous topology. For example, when the switches 118 and 120 are deactivated (e.g., turned off), the diodes 114 and 116 couple the transformer 104 to the output terminal 102 in an asynchronous circuit topology. When the switches 118 and 120 are activated (e.g., turned on alternately, etc.) the switches 118 and 120 couple the transformer 104 to the output terminal 102 in a synchronous circuit topology. Therefore, controller 122 changes between the synchronous and asynchronous modes of operation by controlling activation of the switches 118 and 120.

The controller 122 changes between the synchronous and asynchronous modes of operation based on a value of the output current. The output current is sensed by the controller 122 (e.g., via a shunt, etc. as explained further below), and the controller 122 uses the sensed output current to determine which mode (i.e., synchronous or asynchronous) to use for operation of the power supply 100. As described above, the controller 122 is configured to operate the power supply 100 in the asynchronous topology (which may include DCM operation) when the output current is below a defined threshold, and operate the power supply 100 in a synchronous topology (which may include CCM operation) when the output current is above the defined threshold.

The defined threshold determines when to switch between synchronous and asynchronous modes of operation, and may be based on efficiency characteristics, output current demand (e.g., load demand) capabilities, etc. of the asynchronous and/or synchronous modes of operation. For example, the defined threshold may be an output current value located at a lower end of a high efficiency range of the synchronous mode of operation, where efficiency of the synchronous mode of operation is reduced when the output current drops below the defined threshold.

The defined threshold may include an output current value at a higher end of a range at which the asynchronous mode of operation is capable of meeting an output current demand of a load, etc. For example, the defined threshold may be a point at which the power supply 100 needs to change from DCM operation (e.g., asynchronous mode) to CCM operation (e.g., synchronous topology mode) to meet the increasing output current demand of a load coupled to the output terminal 102 of the power supply 100. In some embodiments, the defined threshold may be around ten percent, twenty five percent, fifty percent, etc. of a maximum output current of the power supply 100. The defined threshold may be determined prior to operation of the power supply 100, may be adjusted during operation of the power supply 100, etc.

As described above, the asynchronous mode of operation allows current to flow through the diodes 114 and 116 from the transformer 104 to the output terminal 102 of the power supply 100. The diodes 114 and 116 may have a constant resistance (e.g., 200 ohms, etc.) that provides a constant voltage drop as the current flows through the diodes 114 and 116. When the output current is lower, power losses across the diodes 114 and 116 are lower (e.g., may be considered negligible, etc.). As the output current increases, the corresponding power loss in the diodes 114 and 116 increases. Therefore, the diodes 114 and 116 may be more efficient when the output current is lower, but less efficient when the output current is higher.

In contrast, when lower output current is flowing through the switches 118 and 120 (e.g., FETs), a resistance between the drain and source of the FET (RDSon) is higher. This can allow the drain to source voltage of the switches 118 and 120 to go high, so the switches 118 and 120 operate in a linear region of the FET, which can produce larger power losses across the FET. When current through the switches 118 and 120 is increased enough to operate the FETs in saturation mode (e.g., minimal RDSon resistance), the power losses across the switches 118 and 120 are reduced. Therefore, the switches 118 and 120 are more efficient when the output current is higher, but less efficient when the output current is lower.

As an example, a low current of about 2 A in a 100 A 54V rated power supply may cause a FET to operate in a linear region having a higher resistance (e.g., 100 ohms, 1000 ohms, etc.). If the current is increased to operate the FET in a saturation region, the low RDSon of the FET may drop to about 0.025 ohm, etc. Therefore, the diodes 114 and 116 have a lower voltage drop (and corresponding power loss) than the switches 118 and 120 when the output current is low, while the switches 118 and 120 have a lower voltage drop (and corresponding power loss) than diodes 114 and 116 as the output current causes the switches 118 and 120 to operate in a saturation region.

In view of the above, in some embodiments the defined threshold may be selected at an output current value where a voltage drop across the diodes 114 and 116 based on the output current value is substantially similar to a voltage drop across the switches 118 and 120 based on the output current value. In this case, the diodes 114 and 116 may conduct the output current below the defined threshold more efficiently below the defined threshold, and the switches 118 and 120 may conduct the output current more efficiently above the defined threshold.

Suitable controllers 122 include a microprocessor, microcontroller, integrated circuit, digital signal processor, etc., which may include memory. The controller 102 may be configured to perform (e.g., operable to perform, etc.) any of the example processes described herein using any suitable hardware and/or software implementation. For example, the controller 122 may execute computer-executable instructions stored in a memory, may include one or more logic gates, control circuitry, etc.

Suitable switches 118 and 120 include, but are not limited to, field effect transistors (FETs), bipolar junction transistors (BJTs), etc. As shown in FIG. 1, the switch 118 may be coupled in parallel with the diode 114, and the switch 120 may be coupled in parallel with the diode 116. As should be apparent, other embodiments may include other suitable switch types, other suitable circuit arrangements of the diodes 114, 116 and the switches 118, 120, etc.

Power supply 100 may be a switching power supply, including a switched-mode power supply (SMPS). The power supply 100 may include a DC/DC power converter having an input terminal for receiving a DC input voltage, with the input terminal coupled to the primary winding 106 of the transformer 104. In this case, the output terminal 102 provides a DC output voltage to a load. The transformer 104 may include any suitable core configuration, with one or more primary windings 106 and one or more secondary windings 106 wrapped around corresponding portions of the transformer core.

Figure 2:
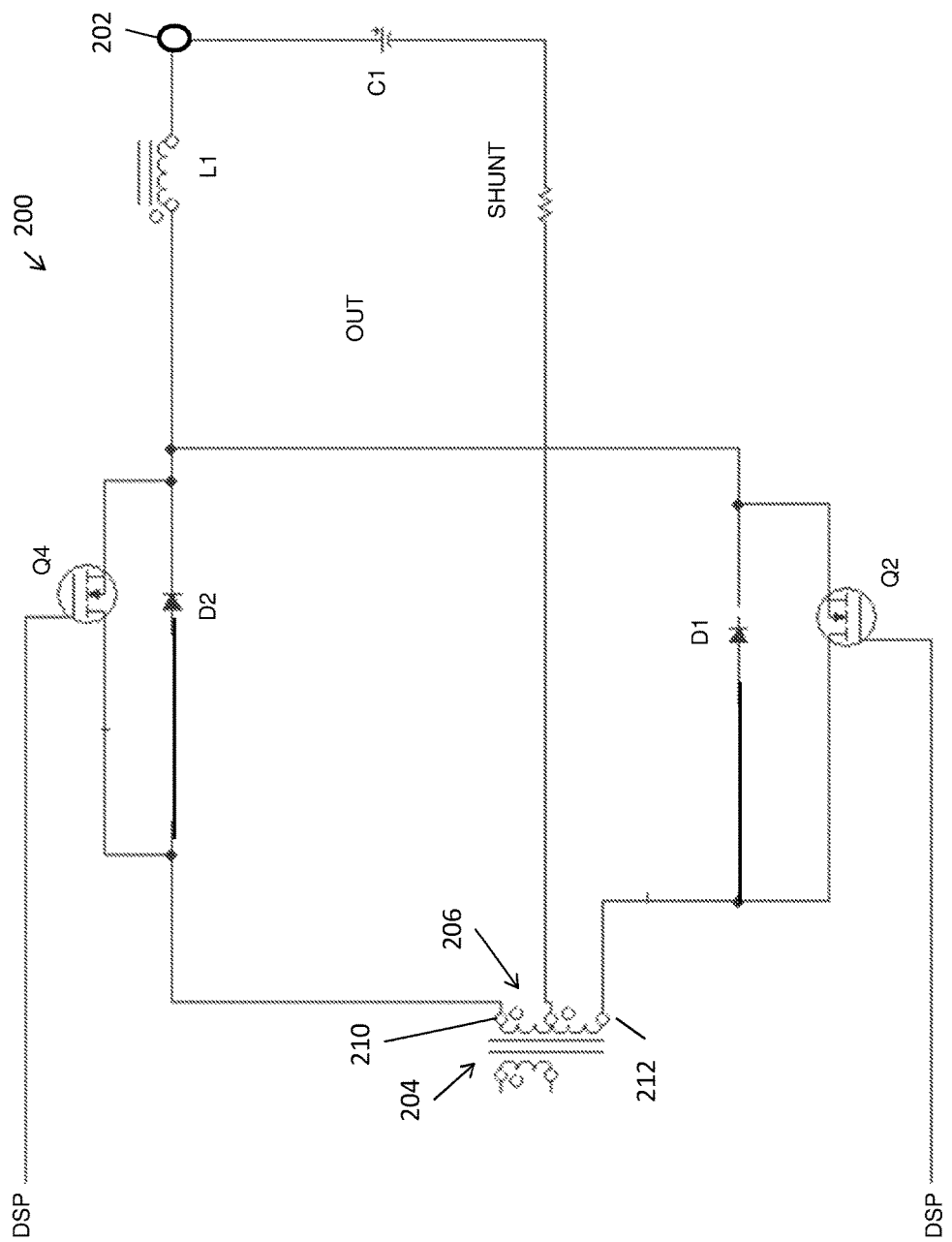
FIG. 2 is a circuit diagram of power supply including an inductor, capacitor and shunt resistor, according to another example embodiment of the present disclosure.

FIG. 2 illustrates a power supply 200 according to another example embodiment of the present disclosure. Power supply 200 is similar to power supply 100 of FIG. 1, but further includes an inductor L1, a capacitor C1 and a shunt resistor (SHUNT).

As shown in FIG. 2, the power supply 200 includes a diode D1 coupled between an inductor L1 and a terminal 212 of a secondary winding 208 of a transformer 204. A switch Q2 is coupled in parallel with a diode D1. The power supply 200 also includes a diode D2 coupled between the inductor L1 and a terminal 210 of the secondary winding 208 of the transformer 204. A switch Q4 is coupled in parallel with the diode D2.

The switches Q2 and Q4 are illustrated as field-effect transistors (FETs), although other embodiments may include any other suitable types of switches. In this example, the controller supplying control signals to the switches Q2 and Q4 is a digital signal processor (DSP).

An inductor L1 is coupled to an output terminal 202, and a capacitor C1 is coupled to the output terminal 202. The capacitor C1 provides an output voltage to a load (not shown) coupled to the output terminal 202.

The shunt resistor (SHUNT) may be used to sense the output current for feedback to the controller DSP. The controller DSP can use the sensed output current feedback from the shunt to determine when to change between synchronous and asynchronous topologies by activating the switches Q2 and Q4.

Similar to the process described above relative to FIG. 1, the controller DSP can change between synchronous and asynchronous modes of operation by activating/deactivating the switches Q2 and Q4. When the switches Q2 and Q4 are deactivated (i.e., turned off) during asynchronous operation, the diodes D1, D2 conduct current. During synchronous operation, the switches Q2 and Q4 are activated (i.e., turned on alternately during their respective periods of voltage polarity at the secondary winding 206 of the transformer 204) to conduct current to the inductor L1. When the output current is above a defined threshold, the switches Q2 and Q4 operate in a saturation region and have a lower RDson than a resistance of the diodes D1 and D2, which can cause more (or substantially all) current to flow through the switches Q2 and Q4. Accordingly, the controller DSP can deactivate the switches Q2 and Q4 to operate the power supply 200 in the asynchronous mode, and activate the switches Q2 and Q4 to operate the power supply 200 in the synchronous mode.

As an example, the switches Q2 and Q4 are initially turned off by the controller DSP. Once the transformer 204 is energized, current flows from the transformer 204 through the diode D1, the inductor L1, and the capacitor C1 until the diode D1 turns off (e.g., is no longer forward biased). Once the diode D1 turns off, the power supply 200 is in a free-wheeling mode where the diode D2 turns on (e.g., becomes forward biased) allowing current to flow from the capacitor C1 through the diode D2 and the inductor L1. Once the capacitor C1 is fully charged, the current stops flowing, which creates a discontinuous current mode. At this point, the capacitor C1 supports the output load voltage and the output load current.

This process repeats until the output current demand exceeds the capabilities of the asynchronous mode of operation. As mentioned above, the shunt resistor (SHUNT) is connected to the controller DSP to monitor output current so that the controller DSP can sequence the gating process for each of the switches Q2 and Q4, thereby changing from an asynchronous mode of operation to a synchronous mode of operation when the output current exceeds a defined threshold.

Once the load current exceeds the defined threshold, synchronous operation begins. The switch Q2 is turned on by a gate pulse from the DSP. Current then flows through the switch Q2, the inductor L1 and the capacitor C1 until the transformer 204 de-energizes. The switch Q4 is then turned on to provide a free-wheeling current path for the inductor L1 and the capacitor C1, thereby providing a continuous conduction mode. This process will continue to repeat based on the output current demand.

Figure 3:
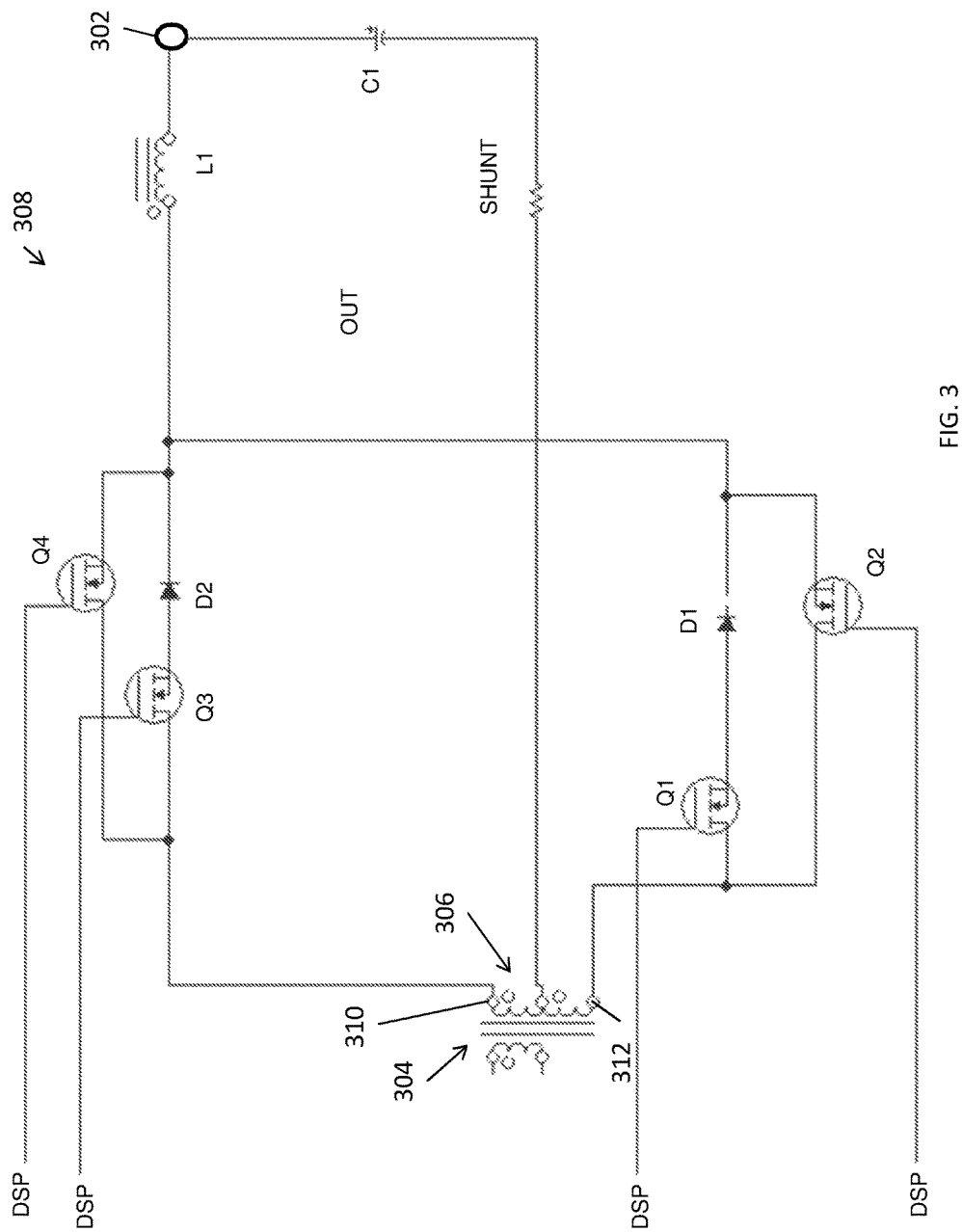
FIG. 3 is a circuit diagram of a power supply having switches coupled in series with diodes, according to another example embodiment of the present disclosure.

FIG. 3 illustrates a power supply 300 according to another example embodiment of the present disclosure. Power supply 300 is similar to power supply 300 of FIG. 2, but further includes a switch Q1 and a switch Q3.

As shown in FIG. 3, the switch Q1 is coupled in series with the diode D1, so that the switch Q1 and the diode D1 are coupled between an inductor L1 and a terminal 312 of a secondary winding 308 of a transformer 304. A switch Q2 is coupled in is coupled in parallel with the combination of the diode D1 and the switch Q1 (e.g., the switch Q2 is coupled in parallel with the series-connected diode D1 and switch Q1).

The switch Q3 is coupled in series with a diode D2, so that the switch Q3 and the diode D2 are coupled between the inductor L1 and a terminal 310 of the secondary winding 308 of the transformer 304. A switch Q4 is coupled in parallel with the combination of the switch Q3 and the diode D2.

The switches Q1 and Q3 are illustrated as field-effect transistors (FETs), although other embodiments may include any other suitable types of switches. The switches Q1 and Q3 each receive a control signal from a digital signal processor (DSP), which may be similar to the controller 122 of FIG. 1, controller DSP of FIG. 2, etc.

The inductor L1 is coupled to the output terminal 302, and the capacitor C1 is coupled to the output terminal 302. The capacitor C1 provides an output voltage to a load (not shown) coupled to the output terminal 302. The shunt resistor (SHUNT) may be used to sense the output current for feedback to the controller DSP. The controller DSP can use the sensed output current feedback from the shunt resistor (SHUNT) to determine when to change between synchronous and asynchronous topologies by selective activating (e.g., turning on and off) the switches Q1-Q4.

Because the switch Q1 is coupled in series with the diode D1 and the switch Q3 is coupled in series with the diode D2, controller DSP can use the switches Q1 and Q3 to change between synchronous and asynchronous modes of operation by coupling and decoupling the diodes D1 and D2 in the current path from the transformer 204 to the output inductor L1 and the capacitor C1. During asynchronous operation, the switches Q1, Q3 and diodes D1, D2 conduct current. During synchronous operation the switches Q2 and Q4 conduct current. Accordingly, the controller DSP can activate the switches Q1 and Q3 to operate the power supply 300 with in the asynchronous mode, and activate the switches Q2 and Q4 to operate the power supply 300 in the synchronous mode.

As an example, the switches Q1 and Q3 are initially turned on by a gate pulse from the DSP. Once the transformer 304 is energized, current flows from the transformer through the diode D1, the inductor L1, and the capacitor C1 until the diode D1 turns off (e.g., is no longer forward biased). Once the diode D1 turns off, the power supply is in a free-wheeling mode where the diode D2 turns on (e.g., becomes forward biased) allowing current to flow from the capacitor C1 through the diode D2 and the inductor L1. Once the capacitor C1 is fully charged, the current stops flowing, which creates a discontinuous current mode. At this point, the capacitor C1 supports the output load voltage and the output current.

This process repeats until the output current demand exceeds the capabilities of the asynchronous mode of operation. As mentioned above, the shunt resistor (SHUNT) is connected to the controller DSP to monitor output current so that the DSP can sequence the gating process for each of the switches Q1-Q4, thereby changing from an asynchronous mode of operation to a synchronous mode of operation when the output current exceeds a defined threshold.

Once the output current exceeds the defined threshold, synchronous topology operation begins. The switch Q2 is turned on by a gate pulse from the DSP, and the switches Q1 and Q3 are turned off. Current then flows through the switch Q2, the inductor L1 and the capacitor C1 until the transformer 304 de-energizes. The switch Q4 is then turned on to provide a free-wheeling current path for the inductor L1 and the capacitor C1, thereby providing a continuous conduction mode. This process will continue to repeat based on the output current demand.

The example circuit diagram and components shown in FIGS. 1-3 are included for purposes of illustration only, and it should be apparent that other suitable circuits and components may be used without departing from the scope of the present disclosure. For example, other power supplies may include different controller(s), different switch component types, different load current sensors, etc.

According to another aspect of the present disclosure, a method of operating a power supply is disclosed. The power supply includes an output terminal, a transformer having a primary winding and a secondary winding, the secondary winding having a first terminal at a first end of the secondary winding and a second terminal at an opposite end of the secondary winding, a first diode coupled between the first terminal and the output terminal, a second diode coupled between the second terminal and the output terminal, a first switch coupled between the first terminal and the output terminal, and a second switch coupled between the second terminal and the output terminal.

The example method includes sensing an output current at the output terminal of the power supply. When the sensed current is below a defined threshold, the method includes operating the power supply in an asynchronous mode by turning off the first switch and the second switch so current flows to the output terminal through the first diode and the second diode. When the sensed current is above a defined threshold, the method includes operating the power supply in a synchronous mode by alternately turning on the first switch and the second switch so current flows to the output terminal through the first switch and the second switch.

The switches may include field effect transistors (FETs). The first diode is coupled in parallel with the first switch and the second diode is coupled in parallel with the second switch.

In some embodiments, the power supply may include a third switch coupled in series with the first diode, and a fourth switch coupled in series with the second diode. In that case, operating the power supply in the asynchronous mode includes turning on the third switch and the fourth switch, and operating the power supply in the synchronous mode includes turning off the third switch and the fourth switch.

In some embodiments, operating the power supply in the asynchronous mode includes operating the power supply in a discontinuous conduction mode, and operating the power supply in the synchronous mode includes operating the power supply in a continuous conduction mode. Operating the power supply in the synchronous mode may include turning on the first switch when the voltage across the secondary winding of the transformer has a positive polarity, and turning on the second switch when the voltage across the secondary winding of the transformer has a negative polarity.

Any of the example embodiments and aspects disclosed herein may be used in any suitable combination with any other example embodiments and aspects disclosed herein without departing from the scope of the present disclosure. For example, power supplies described herein may implement other control methods, the control methods described herein may be implemented in other power supplies, etc. without departing from the scope of the present disclosure.

The example embodiments and aspects of the present disclosure may provide any of the following advantages: increased (e.g., maximized) efficiency over a larger (e.g., entire) load current range of a DC/DC converter, improved efficiency at lower load currents using an asynchronous topology, optimized efficiency below 25 percent of maximum load current, flatter efficiency response from zero load current to high load current, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power supply comprising:
an output terminal for supplying an output current to a load;
a transformer having a primary winding and a secondary winding, the secondary winding having a first terminal at one end of the secondary winding and a second terminal at an opposite end of the secondary winding;
a first diode coupled between the first terminal of the secondary winding and the output terminal;
a second diode coupled between the second terminal of the secondary winding and the output terminal;
a first switch coupled between the first terminal of the secondary winding and the output terminal;
a second switch coupled between the second terminal of the secondary winding and the output terminal; and
a controller coupled to the first switch and the second switch, the controller configured to control the power supply in an asynchronous mode when the output current is below a defined threshold by turning off the first switch and the second switch so current flows to the output terminal through the first diode and the second diode, and to control the power supply in a synchronous mode when the output current is above the defined threshold by alternately turning on the first switch and the second switch so current flows to the output terminal through the first switch and the second switch.

2. The power supply of claim 1, wherein the first switch comprises a field effect transistor (FET) and the second switch comprises a field effect transistor (FET).

3. The power supply of claim 1, wherein the first diode is coupled in parallel with the first switch.

4. The power supply of claim 3, wherein the second diode is coupled in parallel with the second switch.

5. The power supply of claim 1, wherein the controller is operable to control the power supply in a discontinuous asynchronous conduction mode when the output current is below the defined threshold.

6. The power supply of claim 1, wherein the controller is operable to control the power supply in a continuous synchronous conduction mode when the output current is above the defined threshold.

7. The power supply of claim 1, wherein the controller is operable to control the first switch and the second switch during synchronous operation such that the first switch is turned on when the voltage across the secondary winding of the transformer has a positive polarity, and the second switch is turned on when the voltage across the secondary winding of the transformer has a negative polarity.

8. The power supply of claim 1, further comprising:
a third switch coupled in series with the first diode; and
a fourth switch coupled in series with the second diode.

9. The power supply of claim 8, wherein the controller is operable to turn on the third switch and the fourth switch when the output current is below the defined threshold, and to turn off the third switch and the fourth switch when the output current is above the defined threshold.

10. The power supply of claim 1, wherein the defined threshold is an output current value at which the voltage drop across the first diode based on the output current value is substantially similar to the voltage drop across the first switch based on the output current value.

11. The power supply of claim 1, further comprising an inductor coupled between the output terminal and the first diode, the second diode, the first switch, and the second switch.

12. The power supply of claim 11, further comprising a capacitor coupled to the first end of the inductor.

13. The power supply of claim 1, further comprising a shunt resistor coupled to the output terminal to detect the output current.

14. The power supply of claim 1, wherein the defined threshold is an output current that exceeds a maximum output current capability of the asynchronous mode of operation.

15. The power supply of claim 1, wherein the defined threshold is about 25 percent of a maximum output current of the power supply.

16. A method of operating a power supply, the power supply having an output terminal, a transformer having a primary winding and a secondary winding, the secondary winding having a first terminal at a first end of the secondary winding and a second terminal at an opposite end of the secondary winding, a first diode coupled between the first terminal and the output terminal, a second diode coupled between the second terminal and the output terminal, a first switch coupled between the first terminal and the output terminal, and a second switch coupled between the second terminal and the output terminal, the method comprising:
sensing an output current at the output terminal of the power supply;
when the sensed current is below a defined threshold, operating the power supply in an asynchronous mode by turning off the first switch and the second switch so current flows to the output terminal through the first diode and the second diode; and
when the sensed current is above a defined threshold, operating the power supply in a synchronous mode by alternately turning on the first switch and the second switch so current flows to the output terminal through the first switch and the second switch.

17. The method of claim 16, wherein the first switch comprises a field effect transistor (FET) and the second switch comprises a field effect transistor (FET).

18. The method of claim 16, wherein the first diode is coupled in parallel with the first switch and the second diode is coupled in parallel with the second switch.

19. The method of claim 16, further comprising:
a third switch coupled in series with the first diode; and
a fourth switch coupled in series with the second diode.

20. The method of claim 19, wherein operating the power supply in the asynchronous mode includes turning on the third switch and the fourth switch, and operating the power supply in the synchronous mode includes turning off the third switch and the fourth switch.

* * * * *